United States Patent
Rood et al.

(10) Patent No.: US 7,925,702 B2
(45) Date of Patent: *Apr. 12, 2011

(54) REAL TIME INTERNET COMMUNICATIONS SYSTEM

(75) Inventors: Martin S. Rood, Lake Forest Park, WA (US); Hoa Ton-That, South Glastonbury, CT (US); Damion L. Hankejh, Brooklyn, NY (US)

(73) Assignee: Instantservice.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/978,539

(22) Filed: Oct. 29, 2007

(65) Prior Publication Data

US 2008/0222533 A1 Sep. 11, 2008

Related U.S. Application Data

(63) Continuation-in-part of application No. 10/793,181, filed on Mar. 3, 2004, now Pat. No. 7,346,671, which is a continuation of application No. 09/326,258, filed on Jun. 4, 1999, now Pat. No. 6,915,336.

(51) Int. Cl.
*G06F 13/00* (2006.01)

(52) U.S. Cl. .......... 709/205; 709/219; 709/227

(58) Field of Classification Search .......... 709/204, 709/205, 206, 217, 219, 223, 225, 227, 229; 719/328, 329

See application file for complete search history.

(56) References Cited

U.S. PATENT DOCUMENTS

| | | | |
|---|---|---|---|
| 5,572,643 A | 11/1996 | Judson | |
| 5,574,784 A | 11/1996 | LaPadula et al. | |
| 5,694,546 A | 12/1997 | Reisman | |
| 5,764,916 A | 6/1998 | Busey et al. | |
| 5,784,568 A | 7/1998 | Needham | |
| 5,794,006 A | 8/1998 | Sanderman | |
| 5,818,441 A | 10/1998 | Throckmorton et al. | |
| 5,818,836 A | 10/1998 | DuVal | |
| 5,828,839 A * | 10/1998 | Moncreiff | 709/204 |
| 5,838,682 A | 11/1998 | Dekelbaum et al. | |
| 5,862,330 A | 1/1999 | Anupam et al. | |
| 5,878,219 A | 3/1999 | Vance et al. | |
| 5,944,791 A | 8/1999 | Scherpbier | |

(Continued)

OTHER PUBLICATIONS

Archways: Making Remote Multimedia Conversations Persistent and Natural, Ahuja et al, http://www.cs.columbia.edu/.about.doree/archways/telecom95/Archways.html, printed Aug. 24, 2006.

(Continued)

*Primary Examiner* — Viet Vu

(74) *Attorney, Agent, or Firm* — Squire, Sanders & Dempsey (US) LLP

(57) ABSTRACT

A novel real time Internet communication system is disclosed. It is a novel way for users to collaborate on the fly, and without having to own or download any programs that then stay resident on the user's computer. Users collaborate in an online environment where they communicate through chat room type dialogue, while at the same time, one or more users designated as leaders guide the other participants' browsers to selected sites on a distributed network or the Internet. It is marketed under a novel business system that makes highly productive software available to businesses and end users, but which is not purchased by customers or end users, has no conventional distribution system, and never requires update, installation or rollout by the customer or end user.

10 Claims, 9 Drawing Sheets

U.S. PATENT DOCUMENTS

| | | |
|---|---|---|
| 5,958,014 A | 9/1999 | Cave |
| 5,960,173 A | 9/1999 | Tang et al. |
| 5,974,446 A | 10/1999 | Sonnenreich et al. |
| 5,987,401 A | 11/1999 | Trudeau |
| 5,990,887 A | 11/1999 | Redpath et al. |
| 6,046,762 A | 4/2000 | Sonesh et al. |
| 6,065,047 A | 5/2000 | Carpenter et al. |
| 6,078,948 A | 6/2000 | Podgorny et al. |
| 6,108,711 A | 8/2000 | Beck et al. |
| 6,144,991 A | 11/2000 | England |
| 6,167,432 A | 12/2000 | Jiang |
| 6,212,178 B1 | 4/2001 | Beck et al. |
| 6,212,192 B1 | 4/2001 | Mirashrafi et al. |
| 6,230,197 B1 | 5/2001 | Beck et al. |
| 6,240,444 B1 | 5/2001 | Fin et al. |
| 6,295,550 B1 | 9/2001 | Choung et al. |
| 6,295,551 B1 | 9/2001 | Roberts et al. |
| 6,310,941 B1 | 10/2001 | Crutcher et al. |
| 6,337,858 B1 | 1/2002 | Petty et al. |
| 6,370,563 B2 | 4/2002 | Murakami et al. |
| 6,381,640 B1 | 4/2002 | Beck et al. |
| 6,449,646 B1 | 9/2002 | Sikora et al. |
| 6,493,447 B1 | 12/2002 | Goss et al. |
| 6,560,707 B2 | 5/2003 | Curtis et al. |
| 6,657,990 B1 | 12/2003 | Dilip et al. |
| 6,690,654 B2 | 2/2004 | Elliott et al. |
| 6,785,708 B1 | 8/2004 | Busey et al. |
| 6,915,628 B2 | 7/2005 | Kamoto et al. |
| 2001/0054064 A1 | 12/2001 | Kannan |
| 2002/0083167 A1 | 6/2002 | Costigan et al. |
| 2002/0194272 A1 | 12/2002 | Zhu |

OTHER PUBLICATIONS

Image File Wrapper of U.S. Appl. No. 09/326,258, electronically captured on Nov. 5, 2010.

Image File Wrapper of U.S. Appl. No. 10/793,181, electronically captured on Nov. 5, 2010.

Image File Wrapper of U.S. Appl. No. 11/981,737, electronically captured on Nov. 5, 2010.

"Internet Call Center: Linking the Internet to Your Call Center", http://www.lucent.com/BusinessWorks/callcenter/brochures/icc_page.html, printed Sep. 29, 1997 (3 pages).

"Internet Call Center", http://www.lucent.com/BusinessWorks/Internet/callcenter.html, printed Sep. 29, 1997 (2 pages).

"Lucent Technologies Debuts WebCall in Japan", http.//www.lucent.com/press/0597/970508.bca.htrni, May 8, 1997, (2 pages).

"Lucent Technologies bring award-winning advanced call center capabilities to small businesses", http://www.lucent.com/press/0697/970610.bca.html, Jun. 10, 1997, (2 pages).

"Lucent Technologies' Internet Telephony Server", http://www.lucent.com/BusinessWorks/internet/wap119a1.html, printed Sep. 29, 1997, (7 pages).

\* cited by examiner

Browser Leading

REAL TIME INTERNET COMMUNICATIONS SYSTEM

This application is a Continuation-in-Part of Ser. No. 10/793,181 filed Mar. 3, 2004, now issued Mar. 18, 2008 as U.S. Pat. No. 7,346,671, which is a Continuation of Ser. No. 09/326,258 filed Jun. 4, 1999, now issued Jul. 5, 2005 as U.S. Pat. No. 6,915,336.

TECHNICAL FIELD

The invention relates to global network communications systems; more particularly, it relates to system and processes for real time communications over a distributed computer network such as the Internet.

BACKGROUND OF THE INVENTION

Communication techniques across distributed networks, such as the Internet on the World Wide Web and intranets enclosed within individual businesses, became increasingly popular beginning in the 1990's. Users of distributed networks are able to communicate in "real time" (meaning almost instantaneously) through the use of programs which receive and display text input to multiple users simultaneously. These displays are known as "virtual rooms" or "chat rooms". In another function, two or more users can each run a program that works in conjunction with their browsers that allows one (the "leader") to control the other users' browsers, at least to the extent of pointing that browser to a location chosen by the leader on the distributed network or Internet. More recently appearing are various collaboration programs that, when all collaborators are running the program and are all logged onto the distributed network or Internet, allow a preselected group of users to collaborate.

What is needed is a way for users to collaborate on the fly, and without having to own or download any programs that then stay resident on the user's computer. Also needed is a way for users engaging in a chat session to control each other's browsers and view the same web pages at the same time.

In addition, at the turn of the century, there were only variations on shrink wrap and click wrap sales of software as product. Computer software would be sold according to conventional business models for the sale of physical product. The difficulty is that software sales in these models all to some extent create a need for updates, distributions and rollouts that are expensive and time consuming.

What is needed is a business system that makes highly productive software available to businesses and end users, but which is not purchased by customers or end users, has no conventional distribution system, and never requires update, installation or rollout by the customer or end user.

DISCLOSURE OF THE INVENTION

A novel, real time, distributed network or Internet communication system is disclosed. It is a novel way for users, customers, agents and clients, to collaborate on the fly, and without having to own or download any programs that then stay resident on the user's computer. Users collaborate in an online environment where they communicate through chat room type dialogue, while at the same time, one or more users or agents designated as leaders drive the other participants' browsers to selected sites on the distributed network or Internet. It is marketed under a novel business system that makes highly productive software available to businesses and end users, but which is not purchased by customers or end users, has no conventional distribution system, and never requires update, installation or rollout by the customer or end user. In some embodiments, this system is referred to herein as an "iSession system".

Customers of the disclosed system are referred to herein as "Clients", while end users are referred to as "Users" if they are customers, employees, researchers, educators or students of a Client, or as "Agents" if they are particular customer service, sales agents or employees of a Client.

Advantageously, the system is used for communication sessions, sometimes referred to herein as "iSessions", in which one or more Users and Agents participate in chat room type communication and simultaneous viewing of materials, sites or web sites on the distributed network.

Optimally, the system operates within a client/server type architecture, and the server or any part of it is sometimes referred to herein as the "iSession server" or "iServer", while the client portion of the system is referred to as an "iSession client", extremely thin client application (TCA), or "iClient". The iServer resides on one or more physical computers connected to the distributed network, runs an iServer application, and, through the iServer application, is operably connected to various client portions of the system. The client portions generally reside on one or more computers remote from the server and are also connected to the server over the distributed network.

The system and method disclosed are advantageously suited for use over a public network such as the Internet due to its widespread availability. When used in conjunction with "network", the term "public" is intended to imply that a client or user's access to the network is advantageously not controlled by or limited to a particular business entity or group of business entities. Likewise, the term "distributed" implies that processing capabilities and services are advantageously spread out among different "nodes" of the network with different nodes providing different services, as opposed to being centralized within a single host, server or LAN. In general, however, the system and method can be used on any type of distributed network over which communication takes place, including both public and private, and hybrid public-private networks.

The disclosed iSession system has created a new Internet communication category. Through the simple click of a button, users enjoy real-time one-to-one or one-to-many dialogue, all while concurrently browsing the Internet or any distributed network. Applications for iSession include customer service, live sales assistance, collaborative research and online interactive training. Adding to its appeal, iSession technology is seamless to the users, requiring no troublesome software to download as well as no server maintenance on a Client's side.

A novel business system is also disclosed. Optimally, within this business system, a Company owns a client/server based information management system, for example a real time internet communications system. No part of the system is for sale, no software or hardware is sold, or conventionally distributed, to Client or User. Instead, and in basic terms only, a business desiring to make the system available to its end users becomes a customer subscriber (Client) to the Company, and provides approved hyperlinks on its web site pages to the Company's server application after a sign up process that sets up the Client's preferences for its own use and default preferences for its end users' uses. The Client pays a subscription rate to the company based, for instance, on end user usage, measured for example either in minutes of use, or instances (hits) of use. Agents and Users then make use of the system as described herein. This usage is noted and recorded by the Company's server application or iServer application and the Client receives invoices or statements from the Company based on the usage information stored in the iServer application and on the agreed subscription rate. Optionally, a value added reseller (VAR) or other reseller of the disclosed system's service enters into a sales relationship with the Company to sign up other businesses. In other respects however, the usage information and invoicing from the Company remains substantially the same; the VAR then internally receives its agreed share of usage revenue from the Company.

The disclosed system and method provides integration of live multi-user dialogue and operator driven browsing capabilities in one window (or "session"), or optionally in separate windows, wherever User or Client so desire, through the iSession chat module containing the browser leading capabilities.

In preferred systems, Users begin communication sessions by clicking on an iSession button or a communication session button located on their favorite website. This immediately begins a real-time dialogue with live sales, education or service personnel in a chat room window. Such personnel are designated as the "leader" of the iSession and they now can directly answer questions, make sales and lead or drive users to any desired location on the web by entering a web address on a special address bar or the like inside the chat environment and activating it. Once activated the iSession or communication session application (optimally, a combination of the iClient or thin client application now optimally temporarily resident on a User's computer and the iServer or server application) direct all the other linked chat participants engaged in that particularly chat, who are also simultaneously running browsers, to any location or web site on the distributed network. Alternately, instead of entering an address, an Agent moves her browser to a new address and, through the iSession application, the browsers of all other chat participants in the iSession are moved to the new address simultaneously. Any normal browser navigation that the leader does is duplicated on the follower's browsers. For example, the leader navigates by clicking on a "hot link" and the other iSession participants' browsers move to the hot link's address along with the leader.

Advantageously, any iSession chat module can be designated as the leader. Optimally, the leader inputs web page navigation instruction or web address into his browser in any of the usual ways: by typing it in, by selecting it from a list of saved addresses or by clicking an icon. Advantageously, this can be accomplished from within the iSession chat module itself. Alternatively, the leader can enter it directly into his browser in any manner accepted by the browser application. The leader's iSession chat module and the leader's browser are integrated in such a way that the address is then communicated through the leaders iSession chat module into the iSession chat modules of all other chat participants or User's in the iSession channel. The iSession chat modules and browsers of the rest of the chat participants, who are in this case the followers, are also integrated in such a way that address or navigation instruction is placed into their respective browsers by their respective iSession chat modules. Each follower browser then "pulls" the selected address's page content and all the chat participants, leader and followers, are then looking at the same web page.

Particularly advantageous is that in this process no web content is pushed. The leader does not go to a particular server and request that web page content be "pushed" to all participants. The server which will eventually serve the web page need have no affiliation with the leader or Agent. The server does not need to be controlled by the leader or Agent, nor need to be instructed by the Agent to download web page content to the other participants. All participants pull web page content through the normal functioning of their browsers. This has a large advantage over any previous art in that the web page can be any page accessible through the Internet or distributed network being used, and no procedures other than normal browsing are used by follower's browsers.

The leader of the iSession drives or leads the other participant's browsers through the integration of his browser with his iSession chat module. Because the iSession chat modules of the participants are in communication with the leader's chat module, the intended address passes from the leader's iSession chat module through the other participants iSession chat modules to be dropped into their browsers.

For example, a Communication Session is started and virtually any number of people then also log into the chat session via typical chat session initiation through the distributed network or Internet. Then, a designated chat leader leads the browsers of preferably all the other chat members to anywhere on the World Wide Web, including URL's within a web site hosted by the chat leader herself. Such a web site could contain all the educational or collaboration materials that she wanted to share with her colleagues. In one embodiment, optional related but floating viewer and chat control portions of the system are also available.

As another example, an enterprise that desires online training of their employees becomes a Client of the iSession company. The Client's trainer begins an iSession and 15 trainees from around the country enter the session, which appears as a chat window and browser window combined. While imparting the training material, the trainer can answer questions from the trainees in real time and, simultaneously, direct the browsers of all the participants to training material contained on websites located anywhere on the Internet.

As another example, an iSession Client uses the iSession system for customer service purposes. A customer service representative, while leading a chat session with an online customer about his difficulty, also leads the customer to web pages showing the customer information that would help in solving his problem, or meeting his needs.

In yet another example, an online store is the iSession Client. A shopper looking to make an online purchase clicks on a unique hyperlink button on the Client's commercial web site. The button connects the User in a real time chat dialogue window with a live sales person. The sales person then answers questions in the chat and in the same session (and optimally from the same chat/browser session window) leads the user to any desired location on the Web to share sales information and to help the user in their online shopping.

In one embodiment, chat communication takes place in a window or screen herein referred to as a "Viewer". The viewer screen is advantageously divided into four primary areas, running preferably rectilinearly from top to bottom of the screen: a largest area for viewers viewing web content, such as for viewing Internet web pages or the content on the distributed network, a strip for various avatars, a strip for viewing chat text, and a strip for a chat input line.

The disclosed system provides real-time, text based, dialogue between "corporate" operators and "consumer" end user browsers, or between any number of users themselves, while giving the User-leader complete ability to drive one or more client browsers to desired locations on the web. In addition, for collaborative usage the drivers seat (or baton) can optimally be passed from enabling any participant to lead the others to any destination on the web. By programmatically enabling the switching of the ability to enter and activate web addresses from member to member, any participant can lead the others to destinations on the distributed network. Advantageously, private "sidebar" discussion is enabled between selected members of a communication session to enhance multi-user collaborations.

For example, an iSession Client uses the iSession system for customer service. One of the Client's customer service managers is training a new customer service employee. During an iSession with a customer who needs service, the manager, the new employee and the customer are all in the same iSession. However, the new employee and the manager both have a private sidebar area on their screen where they have a separate chat dialogue that does not display on the customer's screen. Through this sidebar the manager can "invisibly" make suggestions to her new employee for handling the customers problems. In addition, at some point the manager can assume the browser directing for the iSession and at a later time return it to the new employee.

In preferred systems, a server application resides on one or more computers, optimally in a controlled server bank. In one iSession system embodiment, zero downtime and a fault-tolerant environment are assigned the highest priority; thus the iSession servers are not randomly collocated with ISP addresses across the Internet. Rather, complete product supervision is undertaken in a proprietary controlled server bank, where specially trained technicians monitor the iSession servers continuously with high-level redundancy to ensure 100% product reliability. This differentiating factor prevents any delay in the communication between two iSession users. To these ends, it is desirable to have highly reliable operating system platforms, such as the Sun platform, for iSession servers.

The system and method advantageously utilize coding languages that can be used to create applications that run on the multiple operating system platforms a User might have. Advantageously, languages, such as Java, ASP and other cross platform languages now known or later developed allow programming code to be written which interacts with both the chat environment and the browser environment and effects this browser leading function within a chat environment.

As discussed above, the iSession servers run an iServer application. The server application is configured to log Client's Agents, such as sales, education and service personnel, on and off the system, respond to requests for Communication Sessions, queue Users while waiting for a Communication Session to be initiated and begun, download necessary thin client applications to User computers, run the chat environments used for Communication Sessions between Users and the Client's personnel and (in combination with the thin client applications) direct User's and Agent's browsers to sites on the distributed network. The server application is configured to accept URL or other address input in real time for any site accessible on the distributed network and to direct User's and personnel's browsers to the selected site. Additionally, the iServer application is configured to store and retrieve data related to iSessions, Users, Clients and Agents through interaction with databases or other data storage and retrieval methods well known in the art.

With the novel system and method disclosed herein, there is no need for an installation of a resident program on a User's or Client's local computer; the only installation is on the fly and directed transparently by the iSession server application, at the request, of course, of the User or Client. In the disclosed system, an extremely thin client application (ETC), such as a Java applet, is downloaded to the User's or Client's computer upon receipt of a request by the server application. For example, the request is in the form of an Agent's login routine or by the User clicking on a hyperlink button on a web site. For example, what is downloaded is an ETC or extremely thin client applet of Java based code. No selection in advance or purchase or setup by a user is ever required, and there is no user maintenance whatever; in fact, upgrades all happen on the server and every user download of the extremely thin client application (ETC) is always fresh and fully up-to-date.

For example, a traveling salesperson works for a company that utilizes a sales tracking software. Instead of the software being shipped to the company via a CD or a download, the salesperson's company has become a subscriber to a sales tracking software service. The salesperson's company pays the sales tracking service a monthly fee, and the service offers the most current version of the sales tracking software continuously over the Internet. When the salesperson makes a sale on the road, she clicks a hyperlink on her company's webpage that asks for her user ID and password, and, once she is authenticated, downloads the latest client version of the software (the ETC) to her computer, with which she now interacts and reports. Thus every time she makes a sale, she gets the latest version of the software. Her company never has to update the software on her computer, that is done automatically by the sales tracking software service on Internet servers maintained by them.

Another example is a trainer for a large company. The large company wishes to teach it's immigrant workers English, and subscribes to a provider of ESL (English as a Second Language) teaching software. The large company pays the service for each instance of the software being used. That way, if no new immigrant workers are employed, the large company pays nothing. The trainer travels throughout the country delivering training sessions. When he sets up for a session, he connects a company computer to the classroom network, navigates to the large company website and clicks a hyperlink reading, "Download latest class materials". The latest client portion of the ESL teaching software is then downloaded to the classroom, the latest version of the application resident on the server made available, and the students can begin the lesson. The latest and most effective version of ESL teaching software is delivered without any additional purchase and installation.

Clients of iSession access the system by attaching a link from their website to a pre-authorized proprietary address belonging to the iSession Company. There is no installation required on the Client's server and nothing to download to the Client. Thus, the disclosed system and method enable quick Client sign up, without the Client's information infrastructure's (MIS) assistance, and immediate scaling capabilities. As far as a Client is able to perceive, upgrades to the iSession system are made instantly. There is no slow and costly upgrade distribution system. Upgrades are made (quite literally) overnight on the distributed network or Internet. Preferably, every new release of iServer/iClient software is backward compatible with the last release to prevent channel loss at system upgrade switchover.

The iServer application manages the communication of Agents and Users. The virtual space where Agents and Users are connected through chat rooms and their browsers is sometimes referred to herein as the "iSession cloud" or "iSession switching cloud", similar to the concept of the Internet cloud. While waiting for an available Agent, Users may be placed into what is referred to herein as the "iSession queue". Each iSession or communication session takes place in a "channel", the virtual space where chat and browser viewing is shared, and each user connection is commonly referred to as a "seat".

The general process of the system and method utilizes a real time communications system, like the Internet, to support a chat session service linked to a web site to connect one or more support Agents to at least one User. In a typical embodiment, each Agent logs in to the iSession service while the user browses the website. At some point the User clicks a hyperlink button on the website for assistance and is thereby directed transparently to a virtual queue for users within the iSession cloud. The iServer application then notifies the logged-in Agent that a User has made a request for assistance via the link. The iServer application also initiates a distribution routine whereby a thin client application is sent to the User's machine, so that, when the Agent responds to accept the call from the cloud, both the Agent and the User are placed into an iSession channel or communication environment specially formed by the thin client application on the User's machine and an appropriate iServer operatively connected to the website so that the agent and the user collaborate.

Advantageously, when the User hits a communication session link on a web page, a request to the server application is generated to build on the fly a particularized instance of a thin client application. Optimally, a cookie is left when a User has participated in a communication session and the server application checks for this cookie first. If no cookie is found, then a request for ID is sent to the User. If a cookie is found, there is a verification of the cookie ID. Optionally, during this initial checking process, the page from which the user clicked the hyperlink is also noted and passed along to the server application for data storage in the system databases.

While the following description indicates that the system technology employs the use of HTML documents, DHTML applet tags, Java applets, XML, Apache webserver http streaming, TCP/IP protocols, and other coding languages and protocols commonly used within the art, it should be understood that the novel system and methods disclosed herein can be accomplished through similar cross platform programming languages, such as ASP, VB.net, Python, Perl or PHP, and utilizing other protocols, such as CGI or POSIX, in short, any cross platform programming language and interface protocol now known or later developed. The novel system and method are claimed in any forms or modifications regardless of which programming languages or protocols are used to effect the methods within the system structure.

In one embodiment, the thin client application or iClient is first generated as a DHTML applet tag from database information collected from previous communication sessions, if such information is available for the User. If no User entry is found in the database, then a default thin client application (preferably configurable for each Client) is served to the User, for example, via standard Apache webserver http stream.

Advantageously, a very small amount of installation code is first uploaded to the User's computer and facilitates the download of the rest of the iClient application. In one embodiment, the first thing that is shipped or served is about a 7 Kb "webload" java applet that mediates and controls the rest of the iClient download, along with a cookie if one is not already in place on the User's computer. The initiating installation code, such as the DHTML applet tag referred to above, has parameters that the User's browser uses (by means of a standard process with which the skilled artisan will be familiar) to do the actual request for an iClient initiating application, such as a configured Java applet. The iClient initiating application then provides the connection with the iSession switching cloud and other process disclosed herein. Advantageously, the Client initiating application, in this case a Java applet is also, when received, cached on the user machine in a standard way.

The download of the rest of the iClient desirably takes advantage of the well known "burst phenomenon" and Burst Advantage Architecture (BAA) or like architecture now known or later developed. Because of Internet phenomena and page variables like line speed, TCP/IP protocols, browser loading characteristics, and number of available concurrent sockets, the balance of the iClient download to the user is optimally broken into 12-24 pieces or blocks and sent piecemeal to the user (also known as "break and send"). In an alternate embodiment, there is no initial "webload" applet; instead the entire iClient application is broken down into about 20-30 modules or applets, all of which are downloaded as described herein. Then, when all of the iClient is downloaded and assembled, the whole applet is run, and the Viewer appears on the user screen for the first time in the session, or preferably one small applet is run which then calls and controls all the other applets that make up the iClient.

All of this is invisible to the user, running as it does in the background, and can be concurrent with other computer and/or Internet processes, for example, by loading into an invisible frame. An optional concurrent message (the only thing visible to the user at this time) is displayed in the user's browser to the effect of, "We're connecting you to [Client name or communication session name]."

Once the iClient application has been downloaded to the User's computer, the iServer application is able to manage their connection to a Client's Agent. The User may be placed in the iSession queue for that client to await the next available Agent or she may be immediately introduced into an existing 1-to-many collaboration channel. In one embodiment, an iSession can support around 20,000 seats in a single channel. In preferred systems, a Client determines the maximum number of seats they desire for an iSession (that is, the number of one-to-one sessions the Client wishes to support).

When User(s) and Agent(s) are joined in a channel, they are communicating through the iServer application acting as a proxy in a well known manner. Advantageously, all Internet or distributed network content comes directly from the Internet or network to both User and Agent. On the other hand, chat text goes first to the iServer application and is then sent from the iServer application to the Agent and all other chat room occupants (Users). That way, the chat entrant knows that when she sees the chat text in the chat room window, everyone can see it.

Advantageously, the iSession system is designed to compensate for existing low bandwidth, low memory, hardware and software environments as well as high-bandwidth platforms now know or later developed. In a preferred embodiment, the iSession system easily integrates the usage of voice and video where bandwidth constraints are not an issue. An iSession communications system offers the unique ability to send reliable bi-directional packet streams over HTTP as well as over TCP and UDP. The unique design of the communication system enables 1 to 1, or 1 to many, communication on unlimited scale. The leader can quickly drive every participant's browser to any location on the web. This makes an iSession system ideal for use with live Internet sales, customer service and unprecedented collaboration in both range and scale.

Optimally, the iServer application tracks iSession usage and offers reporting systems to Clients. In a preferred embodiment, each iSession is fully archived. Examples of trackable data include: amount of time a User spent in the queue, the full text of the chat session, online sites to which the User was directed, duration of interaction with a Client's Agent and the text of emails generated. This helps Clients to improve employee performance with direct feedback on technique and strategy. In preferred systems, every event in a session is stored as a date/time stamped transaction, creating a comprehensive pool of data for analysis. Stored session data can be used in a number of ways. For example, the iSystem application creates usage reports enabling Client's managers to evaluate staff performance, training & marketing effectiveness, product interest, subject interest, and the like. Client's management can also identify meeting attendance for certification purposes and identify subject interest and understanding based on session attendance and interaction. With reporting of the amount of time Users have spent in the iSession queue, managers and support staff can identify iSession demand, staffing needs and marketing campaign performance. In addition, through the iSession company's own analysis, suggestions can be made (via secure e-mail) showing where iSession-based performance can improve through resource management. iSession is also able to create market trends reports, helping Clients to identify market shifts on a real-time basis.

Also disclosed is an improvement upon the Agent iSession interface. Advantageously, an Agent controls communication with many users and other Agents working for the Client through an Agent Console. The agent console is the user interface for an improved iSession combined server and thin client application that is configured to perform the following functions. Agents store often used text, URLs and other files, such as image files, sound files or files used by a particular software. Agents are then able to access this data through a file list box in the Agent Console. The application programming allows the agent to "drop" such items into the chat text box, the browser control address entry text box, emails and any other communication ports now known or later developed.

Also in the Agent Console is a display of the "queue tracking" disclosed above in the discussion of reports available to Clients. Advantageously, the Agent views a real time display of a list of all the Users waiting for Agent collaboration and how long they have been waiting. In addition other information about the User is optionally displayed such as from which department they entered the queue (i.e. which web page they clicked the hyperlink on). Preferably, this listing with wait times or other pertinent information is also available for other functions the Agent performs, such as email interactions.

From within the Agent Console, an agent enters a web or distributed network address as described above. By clicking a "View" control button the Agent views a web page in her browser without leading the other chat participants browsers to that page. This allows the Agent to sift through web pages to find the one she wants before leading the other chat participants to the page. Advantageously, a "Send Address" control button then sends the selected web page to all other chat participants chat modules and on to their browsers, causing the display of the selected web page.

Optimally, when the agent enters into chat communication with a selected User, details about the User and the User's previous history are pulled from a linked database or other data source and displayed in the Agent Console for the agent to view during the collaboration. Display is done through common controls such as text boxes, list boxes and data grids. This would allow an Agent for a Client that sells flowers, for example, to note what floral arrangement was purchased in the past and ask the User if they would like to order their ususal arrangement. One Agent may be collaborating in multiple iSessions, each in separate channels with individual Users. Advantageously, as the Agent switches from iSession to iSession, the User detail information displayed also switches to represent the User currently being chatted with.

Optionally, a list of all Users in the channel with selected information is displayed for iSessions with multiple Agents and Users.

Another advantageous improvement is the ability of the Agent to transfer the User to another Agent through the Agent Console. By clicking a "Transfer" control button, the Agent brings up additional interfaces that allows the User to be placed back in a general queue or a special queue for a specific Agent. This would allow an Agent to transfer a User they were unable to help to a queue for an Agent who is a specialist or manager, for example. Once the desired queue is selected, the User is handled in the usual manner for new entrants into the queue or, optimally, placed at the head of the queue or at any point in the queue according to a rating system selected by the Client.

The above disclosed system and method provide improvement to distributed network or Internet communication environments by combining a chat function with a browser leading function.

A method for communication is disclosed in which a User clicks on a special hyperlink button on a website, the User is then connected via the hyperlink to begin a real-time dialogue with a live sales or service person and the service person answers questions, makes sales or leads the User to any desired location on the World Wide Web.

A real-time distributed network or Internet communications system is also disclosed. Within the system are included an iSession Service and a website. One or more support Agents and a User use the system. The Agent logs in to the iSession service, while a User is browsing the website. The User clicks on an iSession hyperlink on the website and is directed to the iSession cloud, where she is placed in a queue. The iSession switching cloud notifies the logged in Agent that a User has made a request via the hyperlink. The cloud distributes an iSession client application to the User and, when the Agent responds to accept the call from the switching cloud, both the Agent and the User are placed into an iSession channel to collaborate.

Within the system disclosed above is an iSession chat module integrated with a browser in use by the logged-in Agent and a browser in use by the User. The browser in use by the User is integrated with the User iSession client application. The logged-in Agent enters a URL into the iSession chat module integrated with a browser in use by the Agent, directs that the URL be sent to the User iSession client application across the iSession cloud, the User iSession client application receives the URL and the User iSession client application directs the browser in use by the User to pull web content using the URL.

Within the system disclosed above, the Agent's iSession chat module integrated with a browser accesses data stored on computer readable media (for example, the application accesses a database). The data may contain customer details, text files, text file pointers, URL's, image files, image file pointers, iSession history, iSession status, queue status, queue time details, Agent details, departmental details, email details, email history, email status and any other data pertinent to the iSession system and it's Clients.

With URL data now available to the Agent as described in the previous paragraph, the logged-in Agent accesses a URL datum through the iSession chat module integrated with a browser in use by the Agent, displays the URL datum, directs that the URL datum be pushed to the User iSession client application across the iSession cloud, the User iSession client application receives the URL datum and the User iSession client application directs a browser in use by the User to pull web content using the URL datum.

The disclosed system supports a plurality of Agents are logging in to the iSession service. Each of the logged-in Agents uses an iSession chat module integrated with a browser, and each of the iSession chat modules integrated with a browser accesses data stored on computer readable media, the data having content selected from the group of data content consisting of customer details, text files, text file pointers, URL's, image files, image file pointers, communication session history, communication session status, queue status, queue time details, Agent details, departmental details, email details, email history, email status and any other data pertinent to the iSession system and it's Clients.

The disclosed system also supports an Agent, who is placed into an iSession channel with the User, transferring the User into another iSession channel with another Agent.

BEST MODE OF CARRYING OUT THE INVENTION

Figure 1:
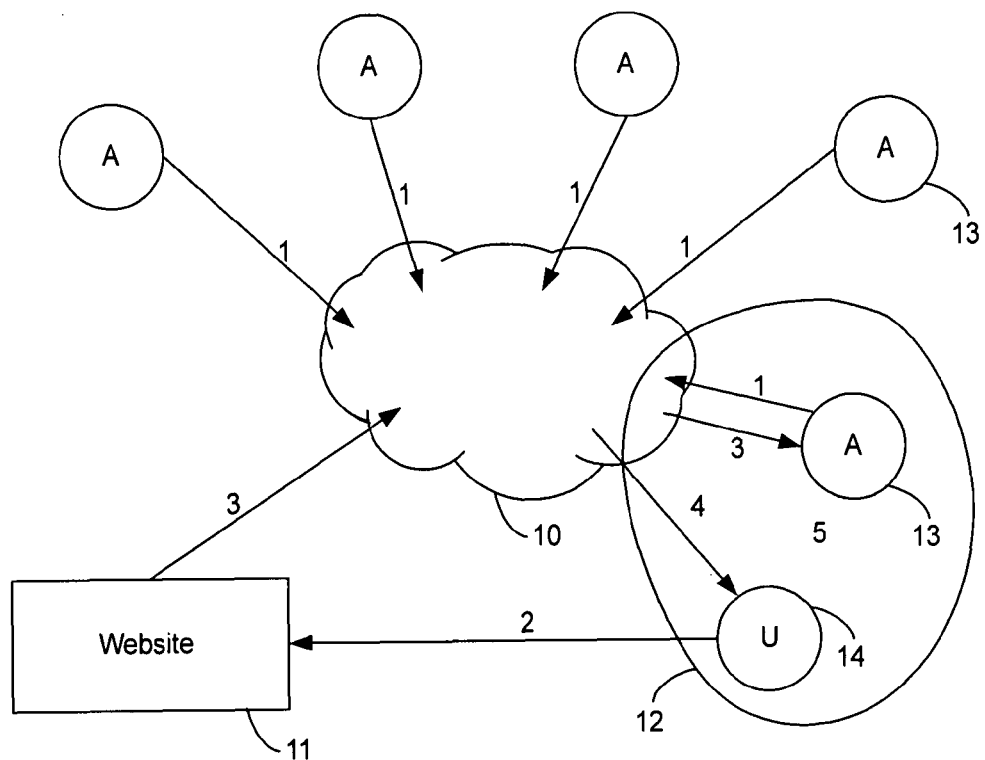
FIG. 1 is a schematic diagram/flow chart of several aspects of the system.

Turning now to the drawings, the invention will be described in a preferred embodiment by reference to the numerals of the drawing figures wherein like numbers indicate like parts.

iSession Process Overview

In FIG. 1, Client's customer support Agents 13 (or other kinds of Agents as discussed above) log in (arrows 1) to the iSession service 10 (the iSession 'cloud' or 'switching cloud') from anywhere on the Net over dial-up or dedicated network connections. Meanwhile User 14 is browsing (arrow 2) the Client's site 11. User clicks on a special iSession hyperlink on the site tagged to suggest that help of a certain type or perhaps just help in general is available by clicking. The link is directed (arrow 3) to the iSession cloud 10, and User 14 is placed in a queue while the iSession switching cloud notifies (arrow 3) logged in Agent 13 that a User has made a Request via the link. Generally while still in the queue, the cloud distributes (arrow 14) the iSession Java client application (the iSession Viewer) to the User. Then, when the Agent responds to accept the 'call' from the switching cloud, both the Agent and the User are placed (circle 5) into an iSession channel 12 to collaborate. Any number of users can be placed into an iSession channel. When the Agent or the (last) User exits the iSession Viewer, the related iSession channel is destroyed in the switching cloud. New iSession channels can be created on the fly (about 2000 channels possible for each iSession server application node).

Process Detail iSession Agent Loin

Figure 4:
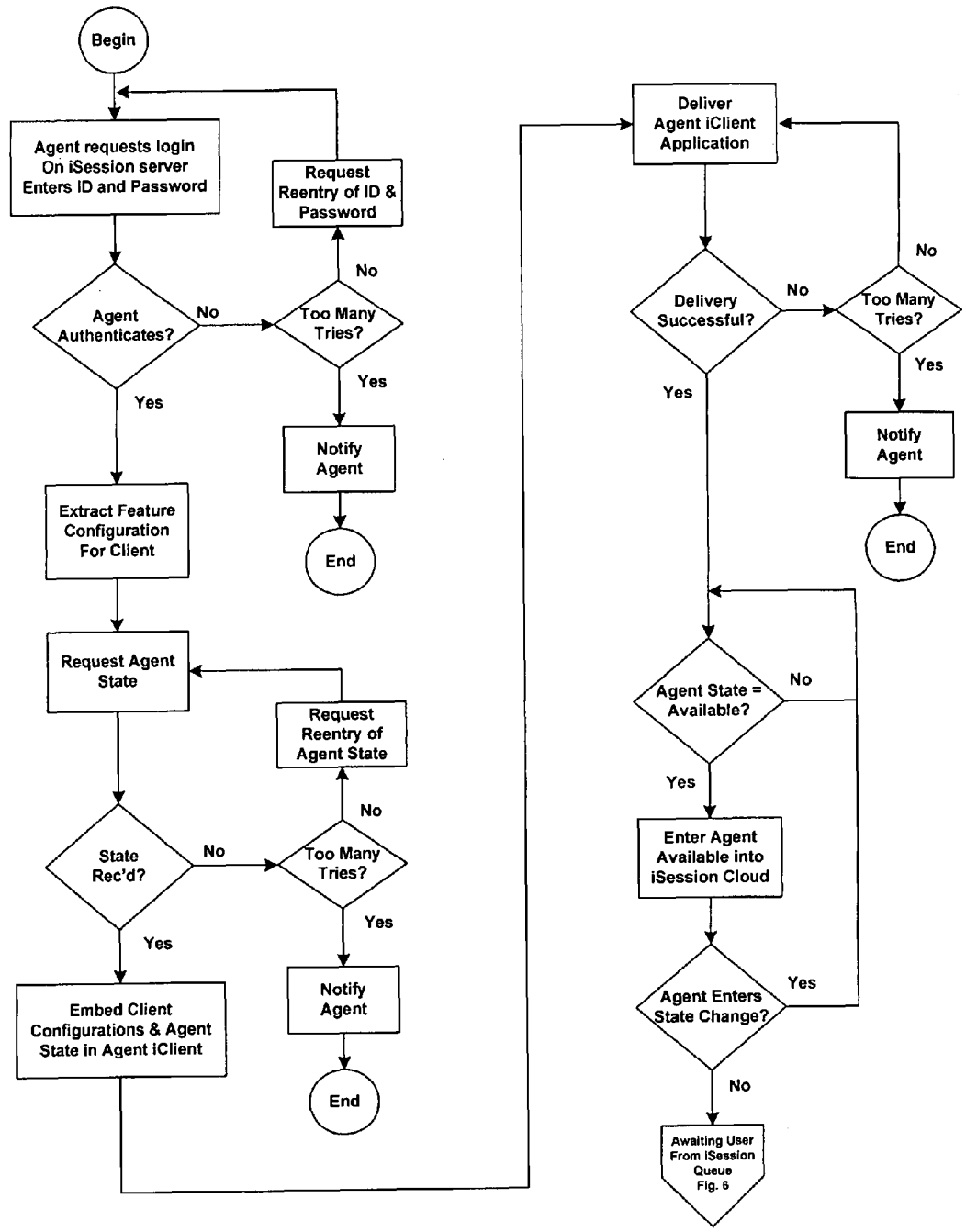
FIG. 4 is a flowchart of a process the iServer application performs in one embodiment.
Figure 5:
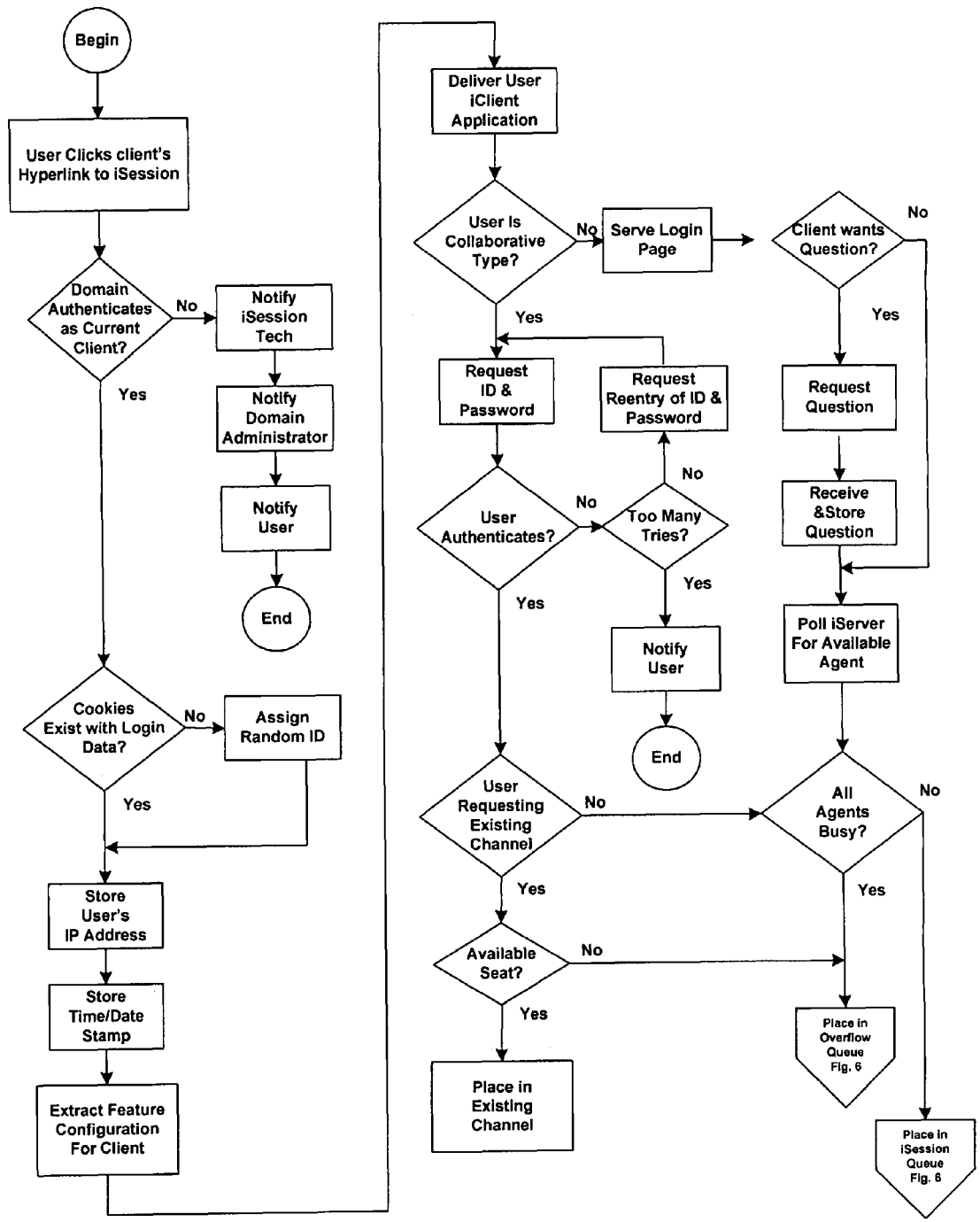
FIG. 5 is a flowchart of a process the iServer application performs in one embodiment.
Figure 6:
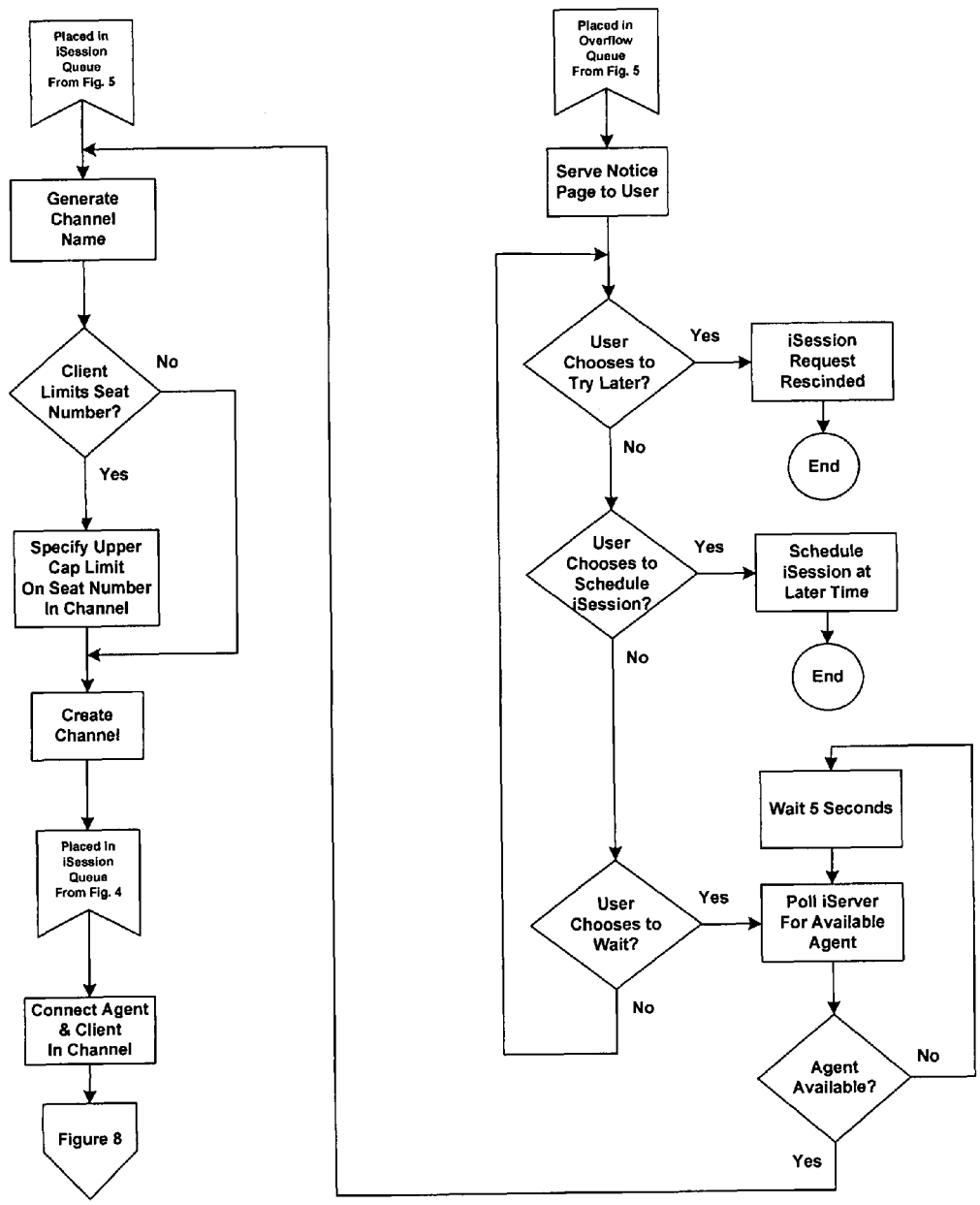
FIG. 6 is a flowchart of a process the iServer application performs in one embodiment.

FIG. 1 is further illustrated by the process flowcharts of FIGS. 4-6. As illustrated in FIG. 4, an Agent 13 visits an iSession server login process using a Java compliant browser, such as IE 4+ or Netscape 3+, over a secure connection such as SSL. Login requests from Agent 13 a user ID and password for authentication.

Upon submission of a user ID and password, iSession service 10 authenticates Agent 13 against a Client's records for its Agents in the iSession database. iSession service 10 inquires of agent's state (i.e. available, on break, away from desk—these state options are desirably determined by the Agent's Client feature configuration), and annotates that state for Agent 13 in an iSession database and places Agent into queue for receiving "calls". Agent is responsible for correct status notification after this.

Upon authentication, an agent's IP address and a time/date stamp is annotated in an iSession database for the agent logging in. Particularized Client Agent feature configuration is extracted from an iSession database and a Java applet request embedded in an HTML document is built.

The Client Java applet HTML document is then web served to Agent 13.

iSession User Request

As illustrated in the flowchart of FIG. 5, within a Java-compliant browser, User 14 clicks on an iSession hyperlink to request access to a live one-on-one or one-to-many session. If User 14 has previously interacted with iSession service 10 (via the current Client or any other iSession Client), iSession service 10 checks for cookies on the User's machine containing iSession login data.

iSession service 10 queries an iSession database to authenticate requesting domain as an iSession Client. If requesting domain is not authenticated, it notifies iSession network engineers, e-mails domain administrator and informs User 14 that this Web site, while it has a hyperlink to iSession service 10, does not authenticate as an iSession Client, and the process ends.

Upon authentication, User 14's IP address and a time/date stamp is annotated in an iSession database for the User logging in. iSession service 10 extracts a Client feature configuration from an iSession database and builds a Java applet request embedded in an HTML document. If available, it places a cookie login data into secure (SSL) iSession/User login web page. If no cookie is available, and if User 14 is a customer service type customer or the like, then iSession service 10 assigns a random generated user ID for User 14 for server purposes; if User 14 is a collaborative type user, an ID and password are requested. There is also an optional chance at about this point in the process for User 14 to enter his "question" for Agent 14, which is also stored in an iSession database. iSession service 10 begins caching iSession/iClient components (such as interface imagery) on the User machine in an invisible frame. In the same HTML document, the User's question to be passed to an Agent is asked for. iSession service 10 Web serves the login page to User 14.

User 14 is placed in iSession queue for next available Agent or User 14 is introduced into an existing 1-to-many collaboration channel. iSession service 10 Web serves the client Java applet HTML document to User 14.

iSession Virtual Channel Established

As illustrated in FIG. 6, if a new channel 12 is required and an Agent 13 is available, a virtual channel name is generated, composed of the associated iSession Client name and a time/date stamp. While the iSession Client can specify an upper cap on the number of participants allowed in a single channel 12, iSession does not otherwise limit channel population.

When Agent is available, iSession service 10 queries an iSession database to ensure iSession Client seats are available for the addition of another participant. If the maximum number of iSession Client seats are in use, iSession service 10 jumps to Process: Overflow Queue.

Overflow Queue

As further illustrated by the flowchart in FIG. 6, iSession service 10 is notified by an iSession database that all Agents are busy, or that all seats are occupied. iSession service 10 serves a notice page to User 14 informing her that she has three options: 1) wait for the next available agent or seat and continue browsing the Web, 2) schedule an iSession for a later day or time, or 3) try again later (thus rescinding the iSession request).

Wait for Agent/Seat

Continuing with the flowchart of FIG. 6, iSession service 10 is continuously polled every five seconds by the iSession notice window via a meta refresh tag to check for an available seat or Agent 13. If poll fails, the notice window remains unchanged and continues polling.

Figure 2:
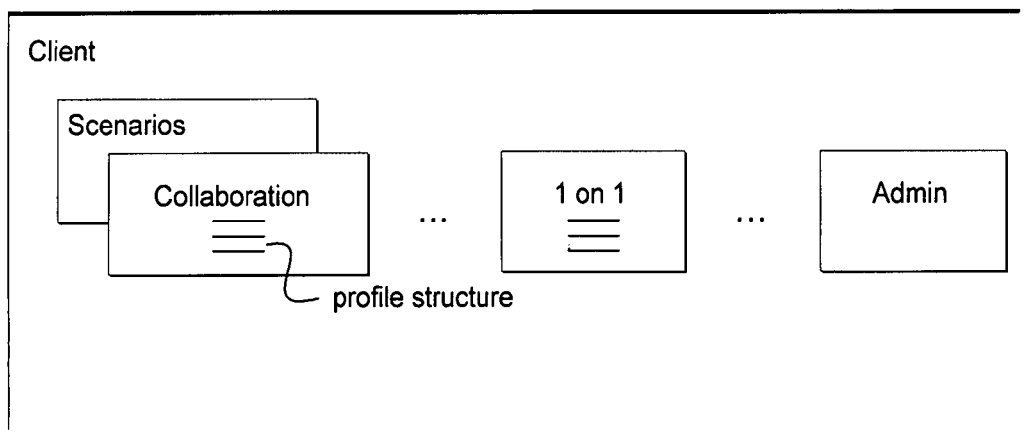
FIG. 2 is a schematic of a files aspect of the system.

FIG. 2 shows the way stored iClient configurations are preferably ordered and arranged. Under types of scenarios for each Client, there are for example collaborative scenarios, 1-on-1 scenarios, administrative scenarios, and the like, each scenario having its own profile structure (including information on preferred graphics, avatars, ad banners or links) in XML and can be configured as default settings, archived configurations, all in a User/Agent database on the iServer.

Figure 3:
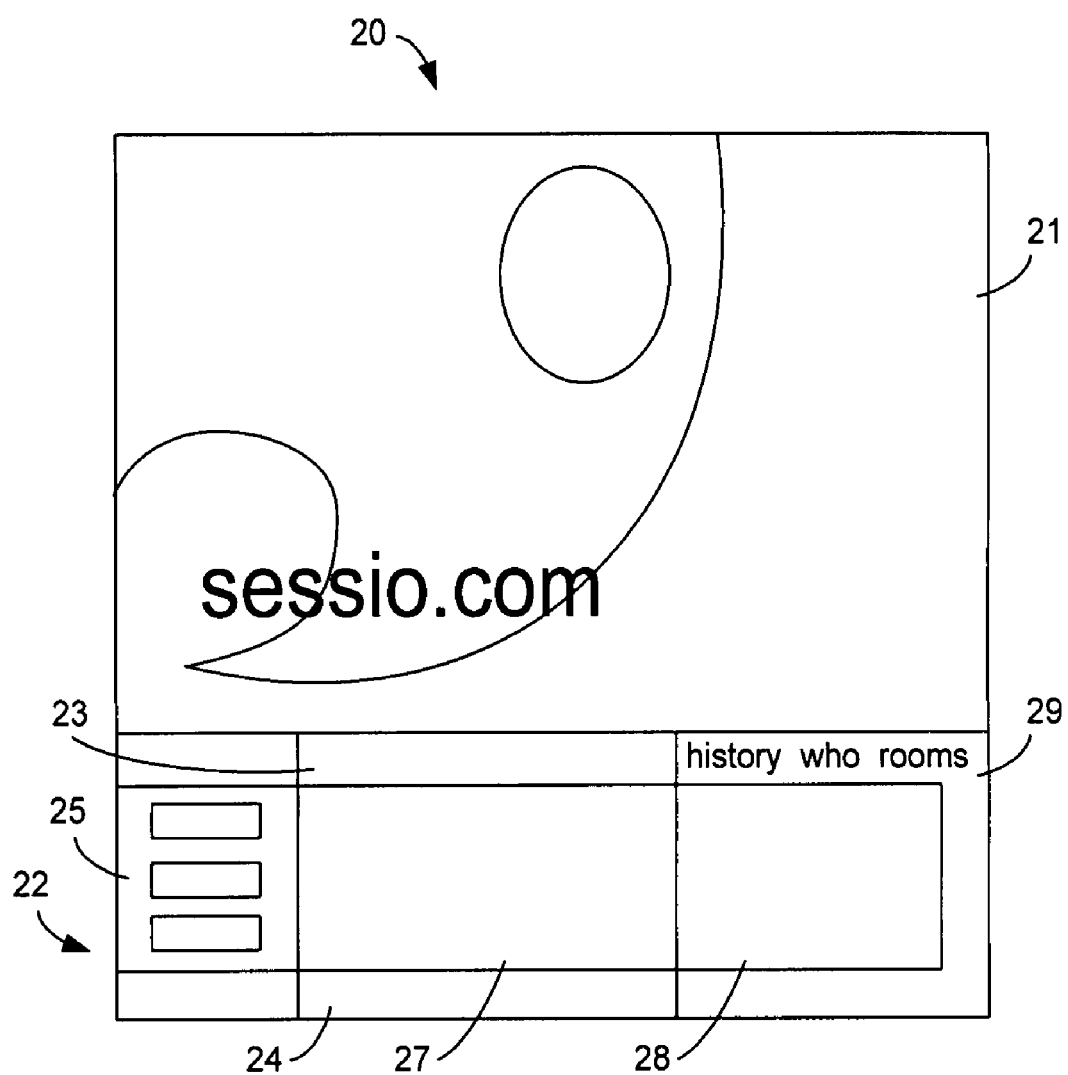
FIG. 3 is an illustration of a typical user interface screen.

In FIG. 3 a typical user interface screen 20 is schematically shown. A large area 21 is for the User's browser view and can optionally be set to float. Outside (for example, below or above the view area 21) is the chat control section 22. Other frames in section 22 include an address bar 23 for navigating or leading to a new website in the viewer, a typing bar 24 for chat input, a chat window 27 to view chat text, a button section 29 to control what shows in view window 28 (either history, who or rooms) and a control button section 25 for help, exit, and the like.

The iSession system preferably resides on a proprietary bank of controlled servers. Traffic is handed off from Client websites to the iSession Company network in order for Clients to interact with their website visitors. Because of the complexity of the system infrastructure it is desirable that the network not fail at any given point, and that it preferably run with 100% uptime reliability. A highly reliable server environment, for example a Unix platform, is chosen for reliability.

Figure 7:
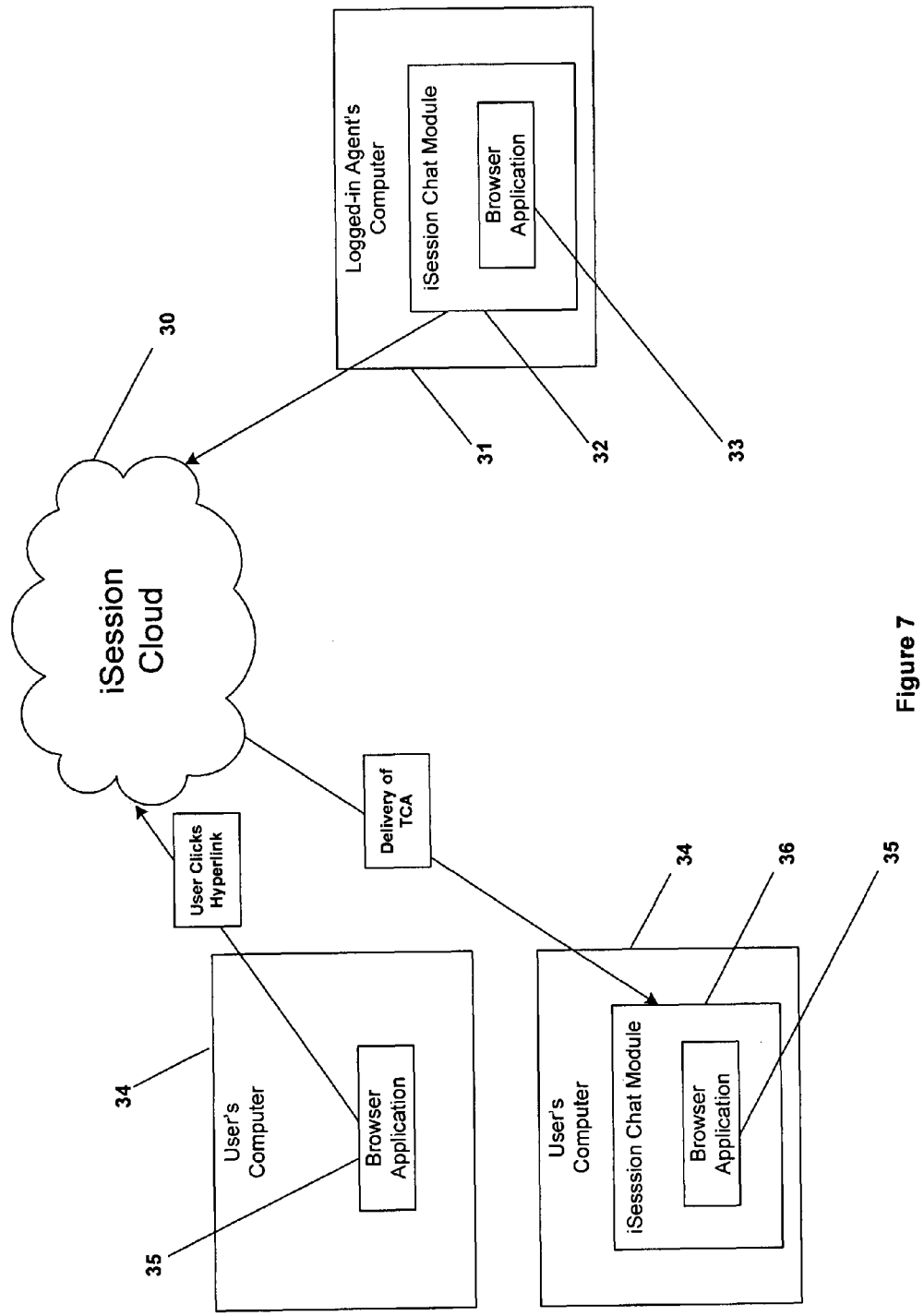
FIG. 7 is a schematic diagram of one aspect of the system.

FIG. 7 illustrates an interface between an Agent's or User's browser application, and iSession thin client applications. A browser application 33 is in use on an Agent's computer 31. The Agent has logged in to an iSession service and an iSession chat module 32 has been downloaded to Agent's computer 31 as an extremely thin client application (TCA). Chat module 32 now interfaces with Agent browser application 33. Meanwhile, a User is using her computer 34 and browsing a distributed network, such as the Internet, using a browser application 35. Note that any browser application may be in use, not necessarily one similar to Agent browser application 33. When the User clicks a hyperlink requesting a collaboration with an Agent, she is placed in the queue in the manner described above. Similarly described above, an extremely thin client application (TCA) is delivered from the iSession cloud, placing an iSession chat module 36 on User computer 34. User browser application 35 is now also interfaced with iSession chat module 36. This system provides for the accomplishment of the process flowcharted in FIG. 8.

Figure 8:
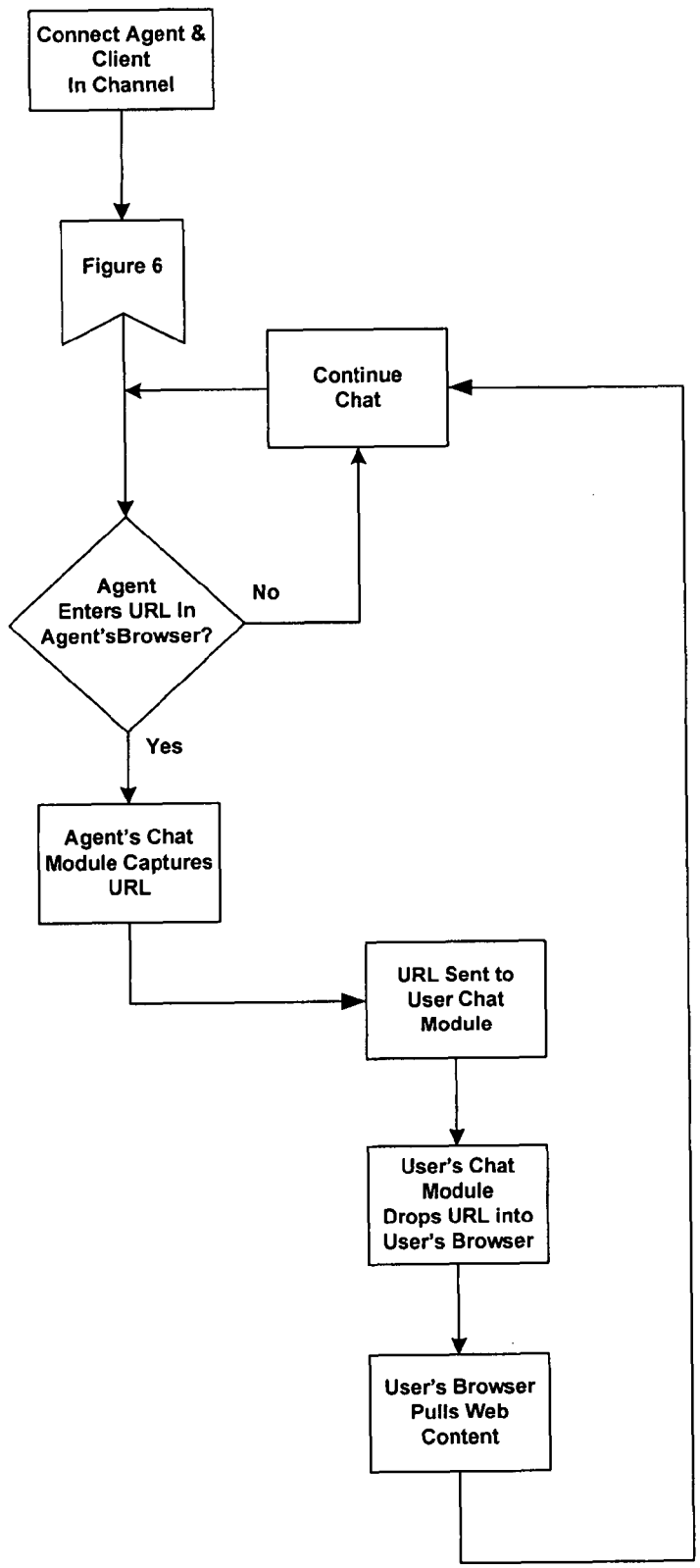
FIG. 8 is a flowchart of a process the iServer application performs in one embodiment.

FIG. 8 is a flowchart illustrating an Agent leading one or more User browsers through the interface of their respective chat modules. An Agent and a User are communicating in an iSession chat environment within an iSession channel. The Agent inputs a web page navigation instruction or a web address (URL) into his browser. Advantageously, this is accomplished from within the iSession chat module itself, by typing the URL into a designated text box, by selecting it from a list box or by clicking an icon or control button within the chat room environment. The Agent's iSession chat module is integrated with the Agent's browser such that the URL is sent to the browser and the web content is pulled for display. (Alternatively, the Agent can enter the URL directly into his browser in any manner accepted by the browser application. Both methods of entry cause the Agent's browser to pull the web content for display on his browser.) However the URL is entered, the Agent's iSession chat module and the Agent's browser are integrated in such a way that the Agent's iSession chat module captures the URL. The URL is then sent through the iSession cloud to the User's iSession chat module (or the chat modules of a plurality of other chat participants or Users in the iSession channel). The User's iSession chat module then drops the URL into the User's browser, causing the User's browser to pull the web content from the Internet according to the programming of the User's browser. Agent and User are now looking at the same web page while continuing their chat.

Figure 9:
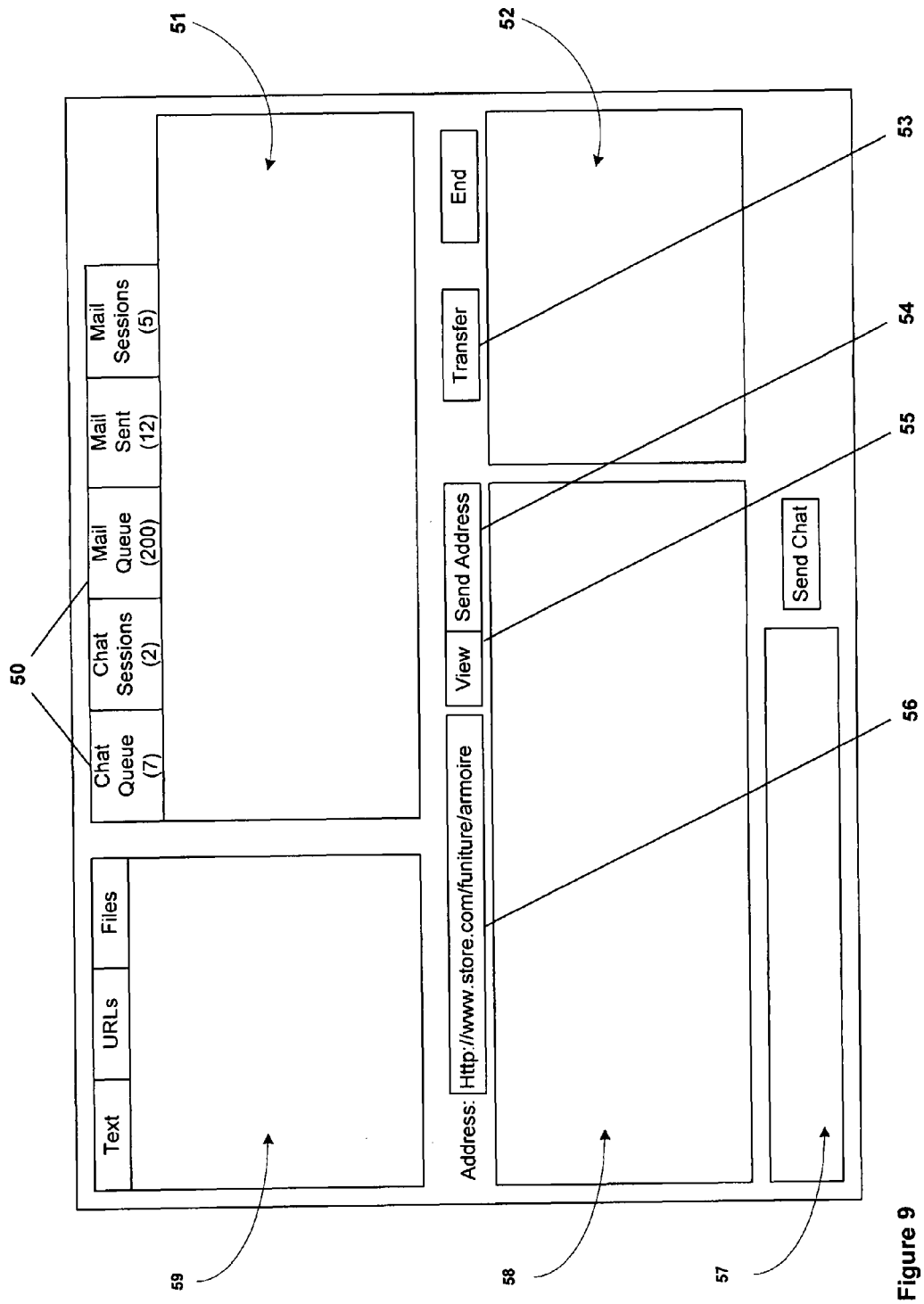
FIG. 9 is an illustration of an Agent interface screen.

In FIG. 9 an Agent Console serving as an Agent iSession interface is schematically shown. A frame 60 contains a file list box or similar navigational tool for accessing stored data made available through the iSession service, such as text, URLs and other files like image files, sound files or files used by a particular software. In one embodiment, Clients make such data available working with the iSession service. Agents are able to select data and, through the iSession combined server and thin client applications' programming, "drop" such items into communication controls such as chat text box 57 and browser control address entry text box 56. Advantageously, tab controls allow for display of alternate data within frame 59.

Frame 51 in FIG. 9 contains an active (continually refreshing) data grid or similar control for the display of "queue tracking" data and email response data. Advantageously, the Agent views a real time display of a list of all the Users waiting for Agent collaboration and how long they have been waiting. In addition, other information about the User is optionally displayed such as from which department they entered the queue (i.e. which web page they clicked the hyperlink on). Preferably, this listing with wait times or other pertinent information is also available for other functions the Agent performs, such as email interactions. Advantageously, tab controls 50 allow for display of alternate data within frame 51.

From within the Agent Console, an agent enters a web or distributed network address into textbox 56. By clicking "View" control button 55, the Agent views a web page in her browser without leading the other chat participants browsers to that page. This allows the Agent to sift through web pages to find the one she wants before leading the other chat participants to the page. Advantageously, "Send Address" control button 54 then sends the web page URL entered into textbox 56 to all other chat participant's chat modules and on to their browsers, causing the display of the selected web page to the other chat participants.

Frame 52 displays details about a User with whom an Agent is currently chatting. Also advantageously displayed is data regarding the User's iSession history and other data pertinent to the collaboration. In one embodiment, Clients make such data available working with the iSession service. Display may be done through common controls such as text boxes, list boxes and data grids. Advantageously, as the Agent switches from iSession to iSession, the User detail information displayed also switches to represent the User with whom the Agent is currently chatting. Optionally, a list of all Users in the channel with selected information is displayed for iSessions with multiple Agents and Users.

"Transfer" control button 53 precipitates programming performed by the iSession combined server and thin client applications for the transfer of the User to another chat session with another Agent or group of Agents. By clicking "Transfer" control button 53, the Agent brings up additional interfaces that allows the User to be placed back in a general queue or a special queue for a specific Agent. This would allow an Agent to transfer a User they were unable to help to a queue for an Agent who is a specialist or manager, for example.

INDUSTRIAL APPLICABILITY

This technology significantly impacts the web in four primary environments; they include sales, collaboration, training, and support, in such industries as electronic commerce, all areas of the medical field, brokerage services, travel services, technical support, and automotive enterprises.

The disclosed system significantly improves the effectiveness, value, and overall return on most Internet, Intranet, and Extranet sites. Client businesses will be able to immediately answer the questions of those who are browsing their site without the assistance of a plug-in, 1-800 service, an additional application, added hardware, or a high-speed connection.

Some benefits of using the iSession system include improved customer service leading to more deal closures, real-time collaborative research facilitating more timely solutions, and finally, the added flexibility to train individuals in the field with a more cost-effective distribution of knowledge and education.

The simple interface and intuitive operation of the iSession system from the users' point of view allows it to be used by novice and professionals alike. One underlying objective is to serve as a universal dialogue interface between WEB hosts (Clients) and their visitors (Users), regardless of language, technical skills or computer hardware, although certain minimum standards are of course required to access the Internet or World Wide Web.

Companies, organizations and groups can use iSession technology to increase the overall responsiveness towards the needs of their patrons. Companies that provide training services and courseware can now use iSessions as a supplemental tool. Sales organizations can use iSessions to increase efficiency, sales and profits. Through iSessions, groups will be able to conduct online presentations regardless of their location (provided they have a computer and a distributed network or Internet connection). Research organizations can use iSessions to exchange real-time information and findings online. Educational organizations can use iSessions to teach classes, grade tests and interact with students. In addition, customer service organizations can provide real-time support on the Internet through iSession technology.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A distributed network communications system comprising:
    a. a first user device having a first user browser and a first user chat module;
    b. a second user device having a second user chat module;
    c. the second user chat module further comprising a browser driving module;
    d. the first user chat module being integrated with the first user browser to form an integrated combination;
    e. the integrated combination being connectable over a distributed network with the second user chat module and its browser driving module for selectable control of the first user browser by the second user chat module's browser driving module, such that the first user browser can thereby be driven to a location on the distributed network selectable by a second user, without operational intervention by a first user;
    f. a distributed network server;
    g. a virtual communications channel and a virtual queue, both associated with the distributed network server; and
    h. a client chat application stored on the distributed network server, the client chat application being distributable to the first user when the first user enters the virtual queue on the distributed network server.

2. The system of claim 1, wherein the distributed network server is configured to join the first user and the second user in a virtual channel for chat communication with each other through the distributed network server.

3. The system of claim 1 wherein the distributed network server is operatively configured to:
    a connect the first user device to the second user device over the distributed network when the first user clicks on a special hyperlink button on a web site accessible to the first user browser;
    b. download a customer chat module to the first user device to provide for a real-time chat with the second user; and
    c. control the first user browser through the first user chat module to drive the customer browser to a location on the distributed network selected by the agent.

4. The system of claim 1 wherein the distributed network server is operatively configured to record usage of the system by the customer and agent.

5. The system of claim 1 further comprising:
    a. a plurality of additional user devices, third and successive user devices each having a user chat module and a user browser in an integrated combination and;
    b. the integrated combination for the first, third and successive user devices connectable over the distributed network with the second user chat module;
    wherein the second user browser driving module being configured for selectable simultaneous control of the first, third and successive user browsers by the second user chat module's browser driving module, such that all other user browsers can simultaneously be driven to a same location on the distributed network selectable by the second user, without operational intervention by any of the other users.

6. The system of claim 1 wherein the distributed network is the Internet and the distributed network server is an Internet server.

7. A distributed network communications system comprising:
    a. a first user device having a first user browser and a first user chat module;

b. a second user device having a browser driving module and a second user integrated chat module enabling simultaneous web browsing and real-time chat functions with a first user;

c. the first user chat module being integrated within the first user browser to form an integrated combination platform for enabling simultaneous web browsing and real-time chat functions;

d. the browser driving module being configured to drive the first user browser to a location on the distributed network selectable by a second user without operational intervention by the first user during a chat session;

e. a distributed network server accessible via a hyperlink on the distributed network for providing real-time chat communications between the first user and the second user, the distributed network server being configured to perform the steps of:

i. in response to the first user clicking on a special hyperlink button on a web site accessible to the first user browser, queuing a first user's request for a chat session in a virtual queue;

ii. notifying a logged-in service agent that the first user has made a request;

iii. downloading first chat module to the first user browser to form the integrated combination platform for enabling the first user to perform simultaneous web browsing and real-time chat functions while the user's request is in the virtual queue;

iv. joining the first user and the service agent in a session for chat communications and collaborative web browsing a virtual communications channel for; and v. authenticating the first user and the service agent and monitoring distributed network server usage.

8. The system of claim 7 further comprising:

a. a plurality of users devices third and successive user devices each having a user chat module and a user browser in an integrated combination;

wherein the integrated combination for the first, third and successive users is connectable over the distributed network with the second user chat module; and wherein the second user's browser driving module is selectable simultaneous control of the first, third and successive user device browsers by the second user chat module browser driving module such that all other user browsers can simultaneously be driven to a same location on the distributed network selectable by the second user, without operational intervention by any other users.

9. The system of claim 7 further wherein the distributed network is the Internet and the distributed network server is an Internet server.

10. A method for network communications comprising the steps on receiving a communication from a first end user computer viewing a web site page of a first business entity that a communication with a customer service representative of the first business entity is desired;

transmitting a first user chat module to the first user computer over the network, the first user chat module being operable when executed on a first user computer to selectably control a browser on the first user's computer and display chat communications directed to the first end user computer;

establishing a packet switched connection between the first end user computer and a first customer service representative computer;

driving the browser on the first user computer to a desired location on the network via data transmitted from the first customer service representative computer over the packet switched connection to the first user chat module;

receiving a communication from a second end user computer viewing a web site page of a second business entity that a communication with a customer service representative of the second business entity is desired;

placing the second end user into a virtual queue;

transmitting a second user chat module to the second user computer over the network, the second user chat module being operable when executed on a second user computer to selectably control a browser on the second user's computer and display chat communications directed to the second end user computer;

establishing a packet switched connection between the second end user computer and a second customer service representative computer;

driving the browser on the second user computer to a desired location on the network via data transmitted from the second customer service representative computer over the packet switched connection to the second user chat module;

wherein the first business entity is separate from the second business entity, and wherein the server is separate from a server that serves the web site page of the first business entity is separate from a server that servers the web site page of the second business entity.

\* \* \* \* \*